United States Patent
Huebler et al.

(10) Patent No.: US 7,066,129 B2
(45) Date of Patent: Jun. 27, 2006

(54) INTAKE MANIFOLD AND RUNNER APPARATUS

(75) Inventors: Mark Steven Huebler, Shelby Township, Macomb County, MI (US); Sherif H. El Tahry, Troy, MI (US); Yongsheng He, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/886,823

(22) Filed: Jul. 8, 2004

(65) Prior Publication Data

US 2005/0072392 A1 Apr. 7, 2005

Related U.S. Application Data

(60) Provisional application No. 60/509,100, filed on Oct. 6, 2003.

(51) Int. Cl.
*F02M 35/10* (2006.01)
(52) U.S. Cl. .............................. 123/184.42
(58) Field of Classification Search ............ 123/184.42
See application file for complete search history.

(56) References Cited

U.S. PATENT DOCUMENTS

| | | | |
|---|---|---|---|
| 4,664,075 A | | 5/1987 | Poulos |
| 5,551,387 A | * | 9/1996 | Carter et al. ............ 123/184.42 |
| 6,202,627 B1 | * | 3/2001 | Akima ........................ 123/336 |
| 6,283,078 B1 | * | 9/2001 | Munetoki et al. ...... 123/184.61 |
| 6,325,053 B1 | * | 12/2001 | Zappador et al. ............ 123/549 |
| 6,357,411 B1 | * | 3/2002 | Aoki ...................... 123/184.24 |
| 6,755,897 B1 | * | 6/2004 | Daly ............................ 95/271 |

* cited by examiner

*Primary Examiner*—John T. Kwon
(74) *Attorney, Agent, or Firm*—Kathryn A. Marra

(57) ABSTRACT

An air intake system for an internal combustion engine includes a manifold defining a chamber in which air is distributed to a plurality of engine cylinders. The chamber includes an inlet and a plurality of outlets, each outlet providing fluid communication between the chamber and an engine cylinder. Each of the plurality of outlets is substantially the same distance from the inlet to provide more consistent gas flow rates through the outlets. The air intake system preferably includes a plurality of runners. Each of the plurality of runners defines a passageway that interconnects one of the outlets to a respective engine cylinder. Each passageway is characterized by the same length and the same cross sectional area.

8 Claims, 1 Drawing Sheet

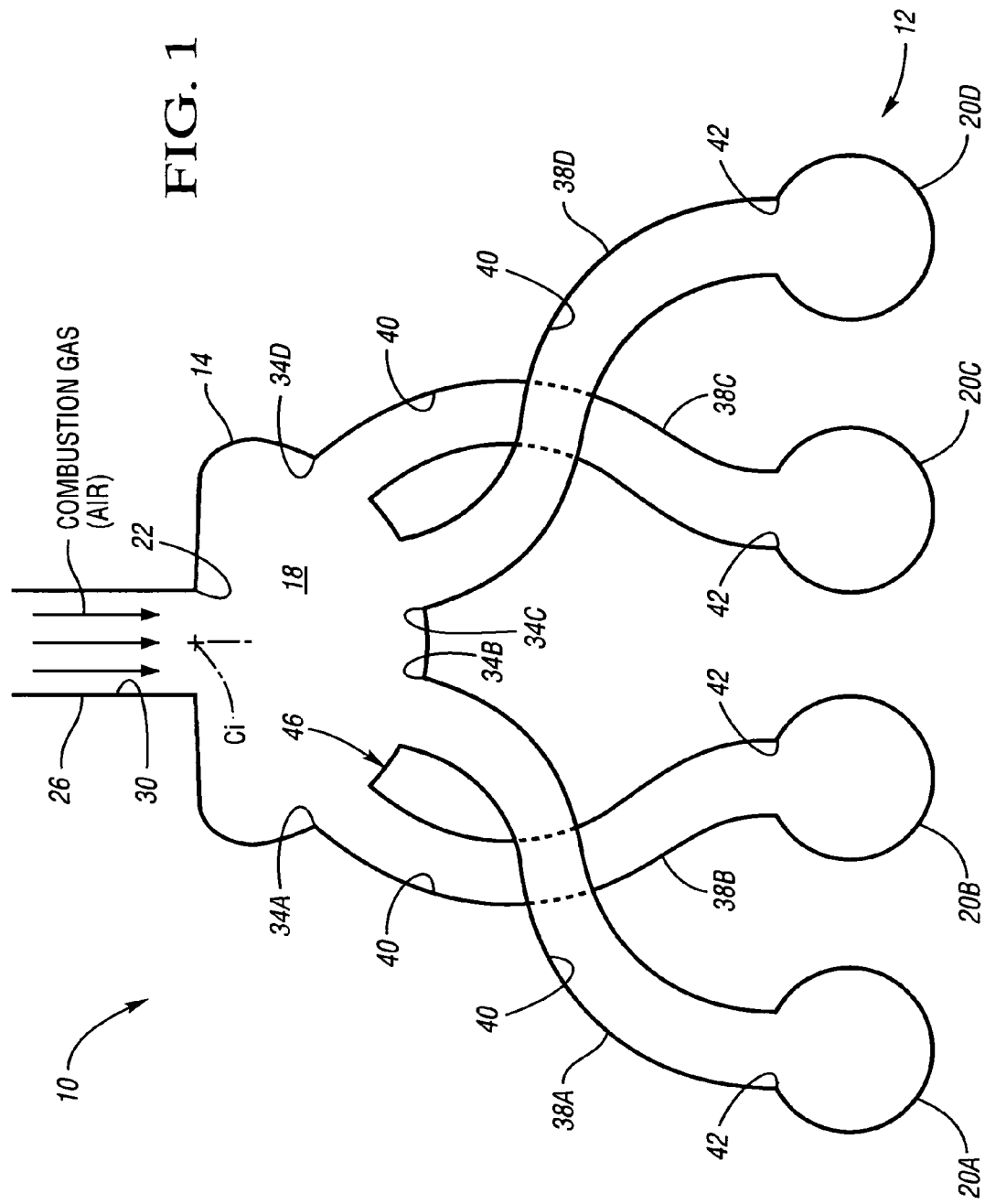

INTAKE MANIFOLD AND RUNNER APPARATUS

CROSS REFERENCE TO RELATED APPLICATION

This application claims the benefit of U.S. Provisional Application No. 60/509,100, filed Oct. 6, 2003, which is hereby incorporated by reference in its entirety.

TECHNICAL FIELD

This invention relates to air intake manifolds having an inlet through which combustion gas enters the manifold, and a plurality of outlets each being substantially the same distance from the inlet.

BACKGROUND OF THE INVENTION

A prior art internal combustion reciprocating engine typically includes an air intake manifold that receives air through an inlet and distributes the air through a plurality of outlets and runners to respective engine cylinder intake ports. Camshaft-operated intake valves open to allow the flow of air and other combustion gases, such as fuel vapor or recirculated exhaust gas, through the intake ports. The geometry of the intake ports is typically configured to cause the air to swirl inside the cylinders.

The desirability of generating swirling motion to an induction charge about the axis of an engine cylinder within a combustion chamber is well known. Such swirling motion produces a number of advantages in both the charge preparation within the combustion chamber and in the combustion of this charge within the combustion chamber. For example, in a conventional spark-ignition homogeneous engine operation, increasing swirl rate (usually defined as the ratio of in-cylinder charge rotative speed to engine rotative speed) has generally increased the burning rate and resulted in decreased fuel consumption. In stratified charge engines, some amount of swirl is also employed to promote mixing between the rich core of fuel and the surrounding air in order to reduce exhaust emissions and fuel consumption. High swirl rates may also be beneficial for maintaining a centrally located fuel-air cloud in certain types of stratified charge engines. Swirl is also used in diesel engines to promote fuel-air mixing for lower NOx emissions and soot formation.

The amount of swirl in a cylinder, as measured by in-cylinder angular momentum flux, is determined in part by the amount of mass flow through an intake port and the ability of the port to generate swirl. Variations in the mass flow rate schedule among a plurality of cylinders can cause substantial differences in the amount swirl generated among the cylinders. The mass flow rate through an intake port is directly related to the difference in pressure upstream of the port/runner and downstream in the cylinder. Thus, any pressure fluctuation differences in the manifold during the intake process for the cylinders can cause inconsistent swirl among the cylinders.

SUMMARY OF THE INVENTION

An air intake system for distributing combustion gas to a plurality of cylinders in an internal combustion engine is provided. The air intake system includes an air intake manifold defining a chamber. The chamber has a gas inlet and a curved inner surface in which a plurality of outlets is defined. The manifold is configured such that each of the plurality of outlets is substantially the same distance from the inlet.

The air intake manifold preferably includes a plurality of runners, each extending from one of the outlets to provide fluid communication between the chamber and an engine cylinder. More specifically, each runner defines a passageway through which combustion gas flows from one of the outlets to a cylinder. The passageway of each runner has the same length and cross-sectional area.

The air intake system of the invention facilitates uniform pressure fluctuations at the gas outlets to reduce or eliminate gas flow rate differences among the plurality of engine cylinders. The more uniform combustion gas mass flow rates result in more uniform swirl rates among the cylinders. More uniform pressure fluctuations at the outlets provides benefits such as more consistent EGR (Exhaust Gas Recirculation) distribution among cylinders.

In an exemplary embodiment, the manifold includes an inner surface that defines at least a portion of the chamber and that is characterized by a shape that is a segment of a circle or sphere. The inlet is approximately the centerpoint of the segment of the circle or sphere. The inner surface defines the outlets so that the outlets are substantially equidistant from the inlet.

The above features and advantages, and other features and advantages, of the present invention are readily apparent from the following detailed description of the best mode for carrying out the invention when taken in connection with the accompanying drawings.

BRIEF DESCRIPTION OF THE DRAWINGS

FIG. 1 is a schematic sectional view of an air intake system for an internal combustion having a plurality of cylinders.

DESCRIPTION OF THE PREFERRED EMBODIMENT

Referring to FIG. 1, an air intake system 10 for an engine 12 is schematically depicted. The air intake system 10 includes a manifold 14 defining a chamber 18 in which combustion gas, including at least air, is distributed among a plurality of engine cylinders 20A–D. Gas enters the chamber 18 via a gas inlet 22. A conduit 26, in the form of a zip tube in the embodiment depicted, defines a passageway 30 that conveys gas to the chamber through the inlet. One end of the conduit 26 is operatively connected to an air filter (not shown) through which air is drawn into the passageway 30 from the atmosphere. Optionally, an EGR inlet (not shown) may inject recirculated exhaust gas into the air flowing in the passageway 30.

The manifold 14 defines a plurality of outlets 34A–D. Runners 38A–D each define a passageway 40 open at one end to a respective outlet 34A–D. Each outlet and runner is in fluid communication with the chamber 18, inlet 22, and conduit 26, and is configured to convey gas from the chamber 18 to a respective cylinder through a respective cylinder port 42. Those skilled in the art will understand the operation of camshaft-operated intake valves (not shown) that open to allow combustion gas to enter each cylinder through the ports 42 during respective intake strokes, and close to prevent fluid communication between the cylinders and the runners during respective compression, power, and exhaust strokes. In the embodiment depicted, each cylinder has only one runner connected thereto. However, within the scope of the claimed invention, each cylinder may have a plurality of runners extending thereto, e.g., if the engine is configured to have two intake valves per cylinder. An exemplary intake port configuration is described in U.S. Pat. No. 4,827,883, issued May 9, 1989 to Khalighi et al., which is hereby incorporated by reference in its entirety. Exhaust ports (not shown) and camshaft-operated exhaust valves (not shown) permit the removal of exhaust gases from the cylinders 20A–D during respective exhaust strokes.

The manifold 14 includes a generally curved inner surface 46 in which the outlets 34A–D are defined and that at least partially defines the chamber 18. In the context of the present invention, a "generally curved" surface is a nonplanar surface that may or may not include angled faces. For example, an octohedral surface is considered "generally curved." In the embodiment depicted, the inner surface 46 forms a portion of the chamber that is a segment of a circle or a sphere, i.e., "partially circular" or "partially spherical," with the centerpoint $C_i$ of inlet 22 being the center point of the circle or sphere. Thus, every point on the surface 46 is substantially the same distance from the inlet 22. Each outlet 34A–D is formed in the surface 46, and accordingly each outlet 34A–D in the manifold 14 is substantially the same distance from centerpoint $C_i$ of the inlet 22.

The equal distance between each outlet 34A–D and the inlet 22 facilitates uniform pressure fluctuations at the gas outlets 34A–D to reduce or eliminate gas flow rate differences among the plurality of engine cylinders 20A–D. To further reduce gas flow rate and pressure variations among the cylinders 20A–D, every runner 38A–D in the intake system 10 is configured to resist flow approximately the same amount. More specifically, the passageway 40 of each runner 38A–D is characterized by the same length and cross-sectional area. Correspondingly, the passageway of each runner has substantially the same volume.

Cylinders 20A–D are typically arranged linearly, whereas the outlets 34A–D are arranged about a curve. In order to accomplish identical lengths among the passageways 40, the runners 38A–D may have differing curvatures, but the curvatures are preferably sufficiently similar in nature so that the runners have substantially identical flow resistance. Similarly, the runners preferably have substantially the same surface roughness.

The manifold 14 is preferably constructed of a lightweight, high temperature thermoplastic such as poly-amide 66 (nylon 66). However, within the scope of the claimed invention, the intake manifold 14 material need not be limited to a plastic material but may also include traditional materials such as steel, aluminum, magnesium, etc.

While the best mode for carrying out the invention has been described in detail, those familiar with the art to which this invention relates will recognize various alternative designs and embodiments for practicing the invention within the scope of the appended claims.

The invention claimed is:

1. An air intake system for distributing combustion gases among a plurality of engine cylinders, the air intake system comprising:

an air intake manifold defining a chamber having a gas inlet and a generally curved inner surface in which a plurality of gas outlets is defined, the manifold being sufficiently configured such that each of the plurality of outlets is substantially the same distance from the inlet; and wherein the outlets are arranged in at least a portion of a sphere having the inlet at its center.

2. The air intake system of claim 1, further comprising a plurality of runners, each of the plurality of runners defining a passageway configured to convey gas from one of the plurality of outlets to a respective engine cylinder; and wherein the passageway of each of the plurality of runners is characterized by substantially the same length and cross sectional area.

3. The air intake system of claim 1, wherein the inner surface forms at least a segment of said sphere having the inlet as its center.

4. The air intake system of claim 1, wherein the outlets are arranged in at least a segment of a circle having the inlet as its center.

5. An air intake system for distributing combustion gases among a plurality of engine cylinders, the air intake system comprising:

an air intake manifold defining a chamber having a gas inlet; an inner surface characterized by a partially spherical shape with the inlet as its centerpoint and defining a portion of the chamber; wherein the inner surface characterized by a partially spherical shape defines a plurality of gas outlets each being substantially the same distance from the gas inlet.

6. The air intake system of claim 5, further comprising a plurality of runners, each of the plurality of runners defining a passageway configured to convey gas from one of the plurality of outlets to a respective engine cylinder; and wherein the passageway of each of the plurality of runners is characterized by substantially the same length and cross sectional area.

7. The air intake system of claim 5, further comprising a plurality of runners, each of the plurality of runners defining a passageway configured to convey gas from one of the plurality of outlets to a respective engine cylinder; and wherein the passageway of each of the plurality of runners is characterized by substantially the same length and cross sectional area.

8. An engine comprising:

an air intake manifold defining a chamber having a gas inlet, an inner surface characterized by a partially spherical shape with the inlet as its centerpoint and defining a portion of the chamber, and a plurality of gas outlets formed in the partially spherical inner surface;

a plurality of engine cylinders; and a plurality of runners, each of the plurality of runners defining a passageway configured to convey gas from a respective one of the plurality of outlets to a respective one of the engine cylinders; and wherein the passageway of each of the plurality of runners is characterized by substantially the same length and cross sectional area.

* * * * *